LINEFINDER
Filed Dec. 15, 1965
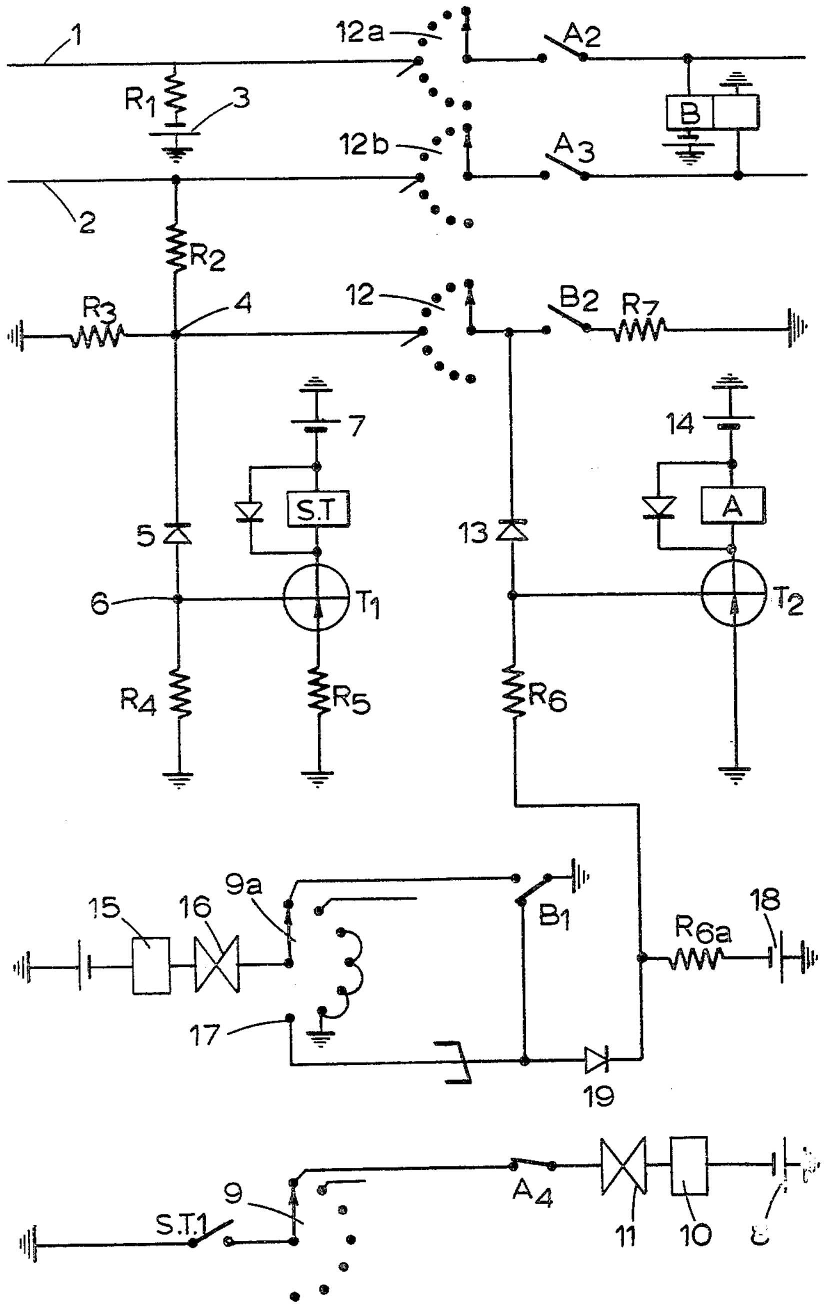
INVENTOR
GEORGE LOUIS BOSTON
BY
Wadhams, Blanchard & Flynn
ATTORNEYS United States Patent Office 3,485,954
Patented Dec. 23, 1969

3,485,954

LINEFINDER

George Louis Boston, London, England, assignor, by mesne assignments, to Stenocord Corporation, Los Angeles, Calif.

Filed Dec. 15, 1965, Ser. No. 513,981
Claims priority, application Great Britain, Dec. 21, 1964, 51,925/64
Int. Cl. H04m *3/56*
U.S. Cl. 179—18 4 Claims

ABSTRACT OF THE DISCLOSURE

Linefinder wherein a single coil, multiple contact relay connects the calling telephone with outgoing and incoming lines, and disconnects power from the linefinder rotary interrupter.

The invention relates to linefinders for communications and switching systems.

Linefinders are known and are generally used to connect one pair of a plurality of pairs of incoming lines to one pair of a plurality of pairs of external lines.

Known linefinders of this kind comprise either electromagnetic relays and rotary switches or fully transistorised electronic equipment.

Linefinders have many uses for example, in telephone systems, computer input circuits remote dictation facilities and for the control of lifts.

A linefinder, for example in a telephone system, employs two relays per line to control the operation of the rotary switches. Such relays are expensive, require regular maintenance and early replacement, are relatively large and require that line loops of a limited resistance should be used.

The invention has among its objects to provide a linefinder which mitigates at least some of the above mentioned disadvantages.

According to the invention a linefinder for communications and switching systems comprises a diode, a transistor, and electro-mechanical means, in which conduction through the diode is effective to bias the base of the transistor to cause the transistor to conduct and cause current to pass from a power source to the electro-mechanical means.

Thus the need for a relay in each line of for example a telephone system is removed and the two relays can be replaced by a simple resistance network, a diode and a transistor, at a very great reduction in cost. The calling loop, containing the resistance network, which is energised when completed by a telephone receiver is not limited by length due to resistance, as the diode and transistor are sensitive to very small currents, of the order of a fraction of a milliamp, which has great advantages compared with the requirement for current of electro-mechanical relays.

The application of the invention is not limited to telephone systems but has utility in many other circuits where electro-mechanical means are required to be controlled by a small electrical current.

One embodiment of the invention is diagrammatically illustrated by way of example in the accompanying drawing which is a circuit diagram of a linefinder in a telephone system.

As shown the incoming lines 1 and 2 to the linefinder are bridged through a telephone when the telephone receiver is lifted and an outside line is required. A circuit is thus made comprising negative battery 3, resistance R1, the caller's telephone, and resistances R2 and R3. Resistances R1 and R2 are advantageously together equal in value to the resistance of R3 and thus a point 4 is set at a negative potential equal in value to half the source voltage, for example in a 24 v. supply at −12 v. A negative current will thus flow through a diode 5 towards point 6 and when applied to the base contact of transistor T1, causes the transistor to conduct. Current is thus allowed to flow, due to a battery 7, through the coil of an electro-mechanical relay S.T. and through resistor R5 causing the relay S.T. to operate. Contact S.T.1 of the relay S.T. is thus closed and allows current flow, due to a battery 8, through the coil 10 and rotary interrupter 11, of a rotary switch 12 and ganged switches **12*a* and 12*b*, through contact A4 which is closed, through the wiper of an allotter switch 9 and through contact S.T.1 to earth. The switches 12, 12*a* and 12*b* start to index around their contacts until switch 12 reaches a contact which has a negative potential due to its connection by way of point 4, resistor R2 and the caller's telephone to battery 3. The negative potential at 4 is applied through switch 12 and diode 13** to the base of transistor T2 to cause it to conduct.

Relay A is operated by the current through transistor T2, from battery 14, causing contact A4 to open and stop further operation of coil 10, thus stopping rotation of the ganged switches 12, **12*a* and 12*b*. Contacts A2 and A3 are also closed thus connecting the caller to an outside line as required and in addition operating relay B. Contact B1 is thus moved to cause ganged allotter switches 9 and 9*a*** to step to the next outlet and to remove the shunting earth from the junction of resistances R6 and R6*a* applying a negative potential from battery 18 to transistor T2, to maintain it conducting. Contact B2 also closes and places an earth through resistance R7 and switch 12 to point 4, thereby ceasing the conduction of transistor T1 which releases relay S.T. to open contact S.T.1.

The drive coil 15 and rotary interrupter 16 of switches 9 and **9*a* isolate themselves as soon as they find a clear outlet, or if all outlets are engaged the wiper of the switch 9*a* comes to rest on a contact 17 which is isolated by the contact B1 being in the upper position as shown. Since the line to contact 17 is a common line, a diode 19 is provided to prevent the contacts B1 of equivalent associated circuits from sensing the potential of battery 18 to give a spurious operation. The equipment thus waits in this condition until further operation of relay B, (caused by replacement of the receiver on lines 1 and 2**) causes the contact B1 to move to the lower position as shown.

The relay S.T. can if required be replaced by a further transistor which further transistor is controlled by current flow through transistor T1 and acts as a current amplifier whereby sufficient current is available to supply the operating coil and rotary interrupter of the switches 12, **12*a* and 12*b*** directly without interposition of a mechanical relay.

I claim:

1. A linefinder system for communication equipment comprising in combination with power supply means:
 - a plurality of calling stations each having a calling line and a switch therein;
 - an external line for connection to any one calling line and having relay contacts therein;
 - linefinder means including linefinder driving circuit means and switch means for connecting said external line to any one calling line;
 - first control means connected to said power supply means effective upon closure of a switch at one of said calling stations to supply power to said linefinder means to drive the latter to connect said one calling line to said external line;
 - and second control means including a relay having a single winding and a transistor switch in series with said winding and connected to be biased to conductive state by said power supply means incident to said linefinder means effecting connection of said external line to said one calling line and to conduct current to energize said single winding, said control means being effective to close said relay contacts in said external line and to open said linefinder driving circuit means thereby to complete a circuit between said one calling station and said external line and to terminate supply of power to said linefinder means.

2. A system as defined in claim 1, characterized in the provision of relay means connected to said external line energized incident to connection of said one calling line to said external line operable to disrupt supply of power to said first control means.

3. A system as defined in claim 2, characterized in that said relay means connected to said external line is further effective incident to connection of said one calling line to said external line to shift biasing of said transistor from said first-named power supply means to a second power supply means included in said system.

4. A linefinder system for communication equipment having a power supply and a plurality of incoming lines each having a switch, an external line and a normally open linefinder switch connected to the external line and having a connection to each of the incoming lines, said system comprising in combination therewith:

first means, including for each incoming line a power supply circuit and a switch and a diode in series therewith to a common junction with others of said incoming lines, effective to produce a biasing potential at said junction incident to closure of said switch;

second means, including a first relay means and a transistor and power supply connected thereto through said first relay means, and a biasing connection to said transistor from said junction effective to render said transistor conductive incident to the presence of a biasing potential at said junction;

third means, including linefinder switch driving means and a power supply connected thereto in series with a normally open contact of said first relay;

fourth means, including second transistor means, a second relay and power supply connected in series therewith, and biasing connections thereto effective to cause conduction of said second transistor means and said second relay incident to finding of an energized incoming line by said linefinder switch means;

fifth means, including relay contacts of said second relay in series respectively in said external line and in series with said linefinder switch driving means, effective incident to energization of said second relay to open said linefinder switch means power supply circuit and to close the circuit of said external line whereby, incident to closure of the switch in any of said incoming lines, connection of that line to said external line is effected and said relay contact in series with said driving means opened to terminate operation of the latter.

References Cited

UNITED STATES PATENTS

| | | | |
|---|---|---|---|
| 2,955,164 | 10/1960 | Faulkner | 179—18 |
| 3,134,857 | 5/1964 | Kolbinger | 179—18 |
| 3,193,621 | 7/1965 | Lummis | 179—18 |

RALPH D. BLAKESLEE, Primary Examiner